US010218522B2

(12) United States Patent
Qiu et al.

(10) Patent No.: US 10,218,522 B2
(45) Date of Patent: Feb. 26, 2019

(54) MULTICAST METHOD, APPARATUS, AND SYSTEM FOR SOFTWARE-DEFINED NETWORK (71) Applicant: Huawei Technologies Co., Ltd., Shenzhen (CN)

(72) Inventors: Zhihong Qiu, Shenzhen (CN); Li Li, Bridgewater, NJ (US); Tao Cai, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 110 days.

(21) Appl. No.: 15/386,401

(22) Filed: Dec. 21, 2016

(65) Prior Publication Data

US 2017/0099156 A1     Apr. 6, 2017

Related U.S. Application Data (63) Continuation of application No. PCT/CN2014/080609, filed on Jun. 24, 2014.

(51) Int. Cl.
*H04L 12/18* (2006.01)
*H04L 12/46* (2006.01)
(Continued)

(52) U.S. Cl.
CPC ............ *H04L 12/185* (2013.01); *H04L 12/18* (2013.01); *H04L 12/4641* (2013.01);
(Continued)

(58) Field of Classification Search
CPC .............. H04L 12/185; H04L 12/1845; H04L 12/4641; H04L 43/0817; H04L 45/48;
(Continued)

(56) References Cited

U.S. PATENT DOCUMENTS 9,258,765 B1* 2/2016 daCosta ................ H04W 84/18
9,871,691 B2* 1/2018 Anand ................ H04L 41/0668
(Continued)

FOREIGN PATENT DOCUMENTS

CN     101087246 A     12/2007
CN     101242342 A     8/2008
(Continued)

OTHER PUBLICATIONS

Foreign Communication From a Counterpart Application, PCT Application No. PCT/CN2014/080609, English Translation of International Search Report dated Mar. 30, 2015, 2 pages.
(Continued)

*Primary Examiner* — Kevin D Mew
(74) *Attorney, Agent, or Firm* — Conley Rose, P.C.

(57) ABSTRACT

A multicast method, apparatus, and system for a software-defined network are presented, where the method includes creating, by a multicast sending device, a multicast group; managing, by the multicast sending device, a member of the multicast group; and completing, by a multicast routing tree management service module disposed on the multicast sending device or on a SDN controller, planning of a multicast routing tree, and converting the planning of the multicast routing tree into a flow entry modification instruction that can be executed by the SDN controller, so that the SDN controller executes the flow entry modification instruction and instructs an SDN switch using a southbound API to execute, according to a modified flow entry, a multicast task. Therefore, multicast is completed by means of mutual cooperation between the multicast sending device and the SDN network.

20 Claims, 7 Drawing Sheets (51) Int. Cl.
*H04L 12/26* (2006.01)
*H04L 12/753* (2013.01)
*H04L 29/12* (2006.01)
*H04L 29/08* (2006.01)

(52) U.S. Cl.
CPC .......... *H04L 43/0817* (2013.01); *H04L 45/48* (2013.01); *H04L 61/2069* (2013.01); *H04L 61/256* (2013.01); *H04L 67/1046* (2013.01)

(58) Field of Classification Search
CPC .............. H04L 61/2069; H04L 61/256; H04L 67/1042; H04L 67/1044; H04L 67/1046
See application file for complete search history.

(56) References Cited

U.S. PATENT DOCUMENTS

| | | | |
|---|---|---|---|
| 9,906,402 B2* | 2/2018 | Ramachandran | H04L 41/0668 |
| 2009/0059923 A1 | 3/2009 | Guo et al. | |
| 2011/0058552 A1 | 3/2011 | Shimizu et al. | |
| 2013/0287026 A1* | 10/2013 | Davie | H04L 49/70 370/392 |
| 2013/0322443 A1 | 12/2013 | Dunbar et al. | |
| 2013/0332399 A1* | 12/2013 | Reddy | G06N 99/005 706/12 |
| 2014/0029410 A1 | 1/2014 | Kannan | |
| 2014/0098813 A1 | 4/2014 | Mishra et al. | |
| 2014/0129700 A1* | 5/2014 | Mehta | H04L 43/0817 709/224 |
| 2014/0211661 A1* | 7/2014 | Gorkemli | H04L 41/12 370/255 |
| 2014/0241247 A1* | 8/2014 | Kempf | H04L 12/4633 370/328 |
| 2015/0103824 A1 | 4/2015 | Tanabe et al. | |
| 2015/0113110 A1 | 4/2015 | Shimakawa | |
| 2015/0139036 A1* | 5/2015 | Liu | H04L 45/02 370/255 |
| 2015/0188808 A1* | 7/2015 | Ghanwani | H04L 45/48 709/244 |
| 2015/0270988 A1* | 9/2015 | Finkelstein | H04L 12/66 370/401 |
| 2015/0281099 A1* | 10/2015 | Banavalikar | H04L 12/4633 370/230 |
| 2016/0080502 A1* | 3/2016 | Yadav | H04L 63/061 709/227 |
| 2016/0105471 A1* | 4/2016 | Nunes | H04L 12/4633 709/228 |
| 2017/0026417 A1* | 1/2017 | Ermagan | H04L 12/4641 |
| 2017/0195207 A1* | 7/2017 | Wanser | H04L 43/50 |
| 2018/0062764 A1* | 3/2018 | Borrill | H04B 10/70 |
| 2018/0069749 A1* | 3/2018 | Singhal | H04L 41/0631 |

FOREIGN PATENT DOCUMENTS

| | | |
|---|---|---|
| CN | 103067534 A | 4/2013 |
| CN | 103346969 A | 10/2013 |
| CN | 103856405 A | 6/2014 |
| EP | 2940970 A1 | 11/2015 |
| JP | 2005043998 A | 2/2005 |
| JP | 2006324919 A | 11/2006 |
| JP | 2009094715 A | 4/2009 |
| JP | 2010252110 A | 11/2010 |
| JP | 2013141201 A | 7/2013 |
| WO | 2012002305 A1 | 1/2012 |
| WO | 2013093857 A1 | 6/2013 |
| WO | 2013145522 A1 | 10/2013 |
| WO | 2013168737 A1 | 11/2013 |

OTHER PUBLICATIONS

Foreign Communication From a Counterpart Application, PCT Application No. PCT/CN2014/080609, English Translation of Written Opinion dated Mar. 30, 2015, 7 pages.
Foreign Communication From a Counterpart Application, European Application No. 14896113.9, Extended European Search Report dated Jun. 21, 2017, 8 pages.
Machine Translation and Abstract of Japanese Publication No. JP2009094715, Apr. 30, 2009, 18 pages.
Machine Translation and Abstract of Japanese Publication No. JP2010252110, Nov. 4, 2010, 15 pages.
Machine Translation and Abstract of Japanese Publication No. JP2013141201, Jul. 18, 2013, 39 pages.
Machine Translation and Abstract of International Publication No. WO2012002305, Jan. 5, 2012, 32 pages.
Foreign Communication From a Counterpart Application, Japanese Application No. 2016-573612, Japanese Notice of Rejection dated Dec. 12, 2017, 2 pages.
Foreign Communication From a Counterpart Application, Japanese Application No. 2016-573612, English Translation of Japanese Notice of Rejection dated Dec. 12, 2017, 3 pages.
Machine Translation and Abstract of Chinese Publication No. CN101087246, Dec. 12, 2007, 14 pages.
Machine Translation and Abstract of Chinese Publication No. CN103346969, Oct. 9, 2013, 17 pages.
Foreign Communication From a Counterpart Application, Chinese Application No. 201480066067.3, Chinese Search Report dated Jun. 25, 2018, 2 pages.
Foreign Communication From a Counterpart Application, Chinese Application No. 201480066067.3, Chinese Office Action dated Jul. 3, 2018, 6 pages.
Machine Translation and Abstract of Japanese Publication No. JP2005043998, Feb. 17, 2005, 15 pages.
Foreign Communication From a Counterpart Application, Japanese Application No. 2016-573612, Japanese Office Action dated May 30, 2018, 3 pages.
Foreign Communication From a Counterpart Application, Japanese Application No. 2016-573612, English Translation of Japanese Office Action dated May 30, 2018, 4 pages.

* cited by examiner

Microsoft Windows [Version 6.1.7600]

Copyright © 2009 Microsoft Corporation All rights reserved.

C: \Users\q00138135>tracert 10.71.146.30

Trace a route to Q00138135H [10.71.146.30] by using a maximum of 30 hops:

| | | | | |
|---|---|---|---|---|
| 1 | 1 ms | <1 ms | 1 ms | 10.66.92.1 |
| 2 | 1 ms | 1 ms | 1 ms | 10.66.0.13 |
| 3 | 5 ms | 13 ms | 9 ms | 10.71.255.26 |
| 4 | 9 ms | 9 ms | 9 ms | 10.71.255.25 |
| 5 | 9 ms | 4 ms | 4 ms | Q00138135H [10.71.146.30] |

Tracing completed

FIG. 7

[root@localhost ~]# ping 2.2.2.202

PING 2.2.2.102(2.2.2.102) 26(84) bytes of data 64 bytes from 2.2.2.102: icmp_seq=1 ttl=128 time=0.594 ms 64 bytes from 2.2.2.100: icmp_seq=1 ttl=128 time=0.806 ms(DUP!)

64 bytes from 2.2.2.102: icmp_seq=2 ttl=128 time=0.142 ms 64 bytes from 2.2.2.100: icmp_seq=2 ttl=128 time=0.223 ms(DUP!)

64 bytes from 2.2.2.102: icmp_seq=3 ttl=128 time=0.092 ms 64 bytes from 2.2.2.100: icmp_seq=3 ttl=128 time=0.104 ms(DUP!)

^C

--- 2.2.2.102 ping statistics ---

3 packets transmitted ,3 received,+3 duplicates, 0% packet loss, tirtt min/avg/max/mdev=0.092/0.326/0.806/0.275 ms

[root@localhost ~]#

MULTICAST METHOD, APPARATUS, AND SYSTEM FOR SOFTWARE-DEFINED NETWORK

CROSS-REFERENCE TO RELATED APPLICATIONS

This application is a continuation of International Application No. PCT/CN2014/080609, filed on Jun. 24, 2014, the disclosure of which is hereby incorporated by reference in its entirety.

TECHNICAL FIELD

Embodiments of the present disclosure relate to the field of communications services, and specifically, to a multicast method, apparatus, and system for a software-defined network.

BACKGROUND

A multicast technology refers to a network technology in which one host sends a single data packet to multiple specific hosts at a time. Multicast is one of basic communications modes in the Internet. As point-to-multipoint communication, multicast is also a highly effective network bandwidth saving method.

A multipoint video conferencing system is a common application scenario of the multicast technology. A multipoint control unit (MCU) of the video conferencing system may be considered as a special-purpose server. In a multiparty conference, all conference parties are connected to the MCU. An audio and video sending device sends its audio and video stream to the MCU, and the MCU copies and then distributes the audio and video stream to each receiving device. Therefore, the audio and video sending device needs to send only one audio and video stream. The MCU completes star or tree networking for conference parties. In a sense, the MCU may be viewed as a switch that is specific to a video conferencing service and has a special function. A disadvantage of implementing the multipoint video conferencing system using the MCU is that, in MCU networking, a large quantity of dedicated devices is required, networking costs are relatively high, and network expansion is inconvenient.

SUMMARY

An objective of embodiments of the present disclosure is to provide a multicast method, apparatus, and system that implement relatively low networking costs and convenient network expansion in a software-defined network (SDN).

According to a first aspect, a multicast method for a software-defined network is provided, including the following steps: creating, by a multicast sending device, a multicast group; managing, by the multicast sending device, a member of the multicast group; and completing, by a multicast routing tree management service module disposed on the multicast sending device or on a SDN controller, planning of a multicast routing tree, and converting the planning of the multicast routing tree into a flow entry modification instruction that can be executed by the SDN controller, so that the SDN controller executes the flow entry modification instruction and instructs an SDN switch using a southbound application programming interface (API) to execute, according to a modified flow entry, a multicast task.

With reference to the first aspect, in a first possible implementation manner of the first aspect, the step of creating, by a multicast sending device, a multicast group is applying, by a group management service module of the multicast sending device using a northbound API of the SDN controller, to the SDN controller for a multicast internet protocol (IP) address or a group identification (ID) defined by the SDN controller itself; and receiving the multicast IP address or the group ID defined by the SDN controller itself, where the multicast IP address or the group ID is returned by the SDN controller using the northbound API.

With reference to the first aspect or the first possible implementation manner of the first aspect, in a second possible implementation manner of the first aspect, the step of managing, by the multicast sending device, a member of the multicast group is receiving, by the group management service module of the multicast sending device, an application for joining the multicast group, where the application is sent by a multicast receiving device; acquiring, by the group management service module, a public IP address of the multicast receiving device; and acquiring, by the group management service module, online status information of the multicast receiving device, and maintaining information about the multicast receiving device according to the online status information.

With reference to any one of the first aspect or the first to the second possible implementation manners of the first aspect, in a third possible implementation manner of the first aspect, after the step of completing, by a multicast routing tree management service module, planning of a multicast routing tree, the method further includes, when the multicast routing tree management service module is disposed on the multicast sending device, sending, by the multicast routing tree management service module, the flow entry modification instruction to the SDN controller using the northbound API of the SDN controller.

With reference to the second possible implementation manner of the first aspect, in a fourth possible implementation manner of the first aspect, the step of receiving, by the group management service module, an application for joining the multicast group, where the application is sent by a multicast receiving device is receiving, by the group management service module, the application for joining the multicast group, where the application is directly sent by the multicast receiving device or indirectly sent by the multicast receiving device using a signaling server; and the step of acquiring, by the group management service module, a public IP address of the multicast receiving device is, when the multicast receiving device has a public IP address, directly sending, by the multicast receiving device, the public IP address of the multicast receiving device to the group management service module; or when the multicast receiving device does not have a public IP address, acquiring, by the multicast receiving device, a public IP address and a port number of the multicast receiving device using a network address translation (NAT) server, and sending the public IP address and the port number to the group management service module using the signaling server.

According to a second aspect, an application end for an SDN network is provided, including a group management service module configured to create a multicast group and manage a member of the created multicast group; and a multicast routing tree management service module configured to complete planning of a multicast routing tree according to the multicast group, and then convert the planning of the multicast routing tree into a flow entry modification instruction that can be executed by an SDN controller, so that the SDN controller executes the flow entry modification instruction and instructs an SDN switch using a southbound application programming interface API to execute, according to a modified flow entry, a multicast task.

With reference to the second aspect, in a first possible implementation manner of the second aspect, the creating a multicast group is applying, by the group management service module using a northbound API of the SDN controller, to the SDN controller for a multicast IP address or a group ID defined by the SDN controller itself; and receiving the multicast IP address or the group ID defined by the SDN controller itself, where the multicast IP address or the group ID is returned by the SDN controller using the northbound API.

With reference to the second aspect or the first possible implementation manner of the second aspect, in a second possible implementation manner of the second aspect, the managing a member of the created multicast group is receiving, by the group management service module, an application for joining the multicast group, where the application is sent by a multicast receiving device; acquiring, by the group management service module, a public IP address of the multicast receiving device that joins the multicast group; and acquiring, by the group management service module, online status information of the multicast receiving device that joins the multicast group, and maintaining information about the multicast receiving device according to the online status information.

According to a third aspect, an SDN controller is provided, including a receiving unit configured to receive a request for applying for a multicast IP address or a group ID defined by the SDN controller itself, where the request is sent by a multicast sending device; a sending unit configured to send the multicast IP address or the group ID defined by the SDN controller itself to the multicast sending device, and send a flow entry to an SDN switch; and a multicast routing tree management service module configured to acquire existing unicast routing information in a network, complete planning of a multicast routing tree according to the unicast routing information, and then convert the planning of the multicast routing tree into a flow entry modification instruction that can be executed by the SDN controller, so that the SDN controller modifies the flow entry according to the instruction and sends the flow entry to the SDN switch using the sending unit.

According to a fourth aspect, a multicast system for an SDN network is provided, including a multicast sending device, further including a group management service module and configured to create a multicast group; a multicast routing tree management service module, disposed on the multicast sending device or an SDN controller and configured to complete planning of a multicast routing tree according to the multicast group; the SDN controller configured to instruct an SDN switch using an API to execute a multicast task; the SDN switch configured to execute the multicast task according to an instruction of the SDN controller; and a multicast receiving device configured to receive data sent by the multicast sending device.

With reference to the fourth aspect, in a first possible implementation manner of the fourth aspect, the creating a multicast group is applying, by the group management service module of the multicast sending device using a northbound API of the SDN controller, to the SDN controller for a multicast IP address or a group ID defined by the SDN controller itself; and receiving the multicast IP address or the group ID defined by the SDN controller itself, where the multicast IP address or the group ID is returned by the SDN controller using the northbound API.

With reference to the fourth aspect or the first possible implementation manner of the fourth aspect, in a second possible implementation manner of the fourth aspect, the multicast routing tree management service module is further configured to convert the planning of the multicast routing tree into a flow entry modification instruction that can be executed by the SDN controller.

With reference to any one of the fourth aspect or the first to the second possible implementation manners of the fourth aspect, in a third possible implementation manner of the fourth aspect, the system further includes a signaling server configured to be used by the multicast receiving device to indirectly send, to the group management service module of the multicast sending device, an application for joining the multicast group.

With reference to any one of the fourth aspect or the first to the third possible implementation manners of the fourth aspect, in a fourth possible implementation manner of the fourth aspect, the system further includes a NAT server configured to be used by the multicast receiving device to acquire a public IP address and a port number of the multicast receiving device when the multicast receiving device does not have a public IP address.

Beneficial effects of the present disclosure are as follows. An application end completes creation and management of a multicast group, and an SDN controller instructs, according to planning of a multicast routing tree, an SDN switch using an API to execute a multicast task. Multicast is completed by means of mutual cooperation between the application end and an SDN network, which greatly reduces complexity of multicast configuration. In addition, in the present disclosure, an audio and video conference can be implemented without a need to further deploy a dedicated MCU, and therefore, network costs can be significantly reduced.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
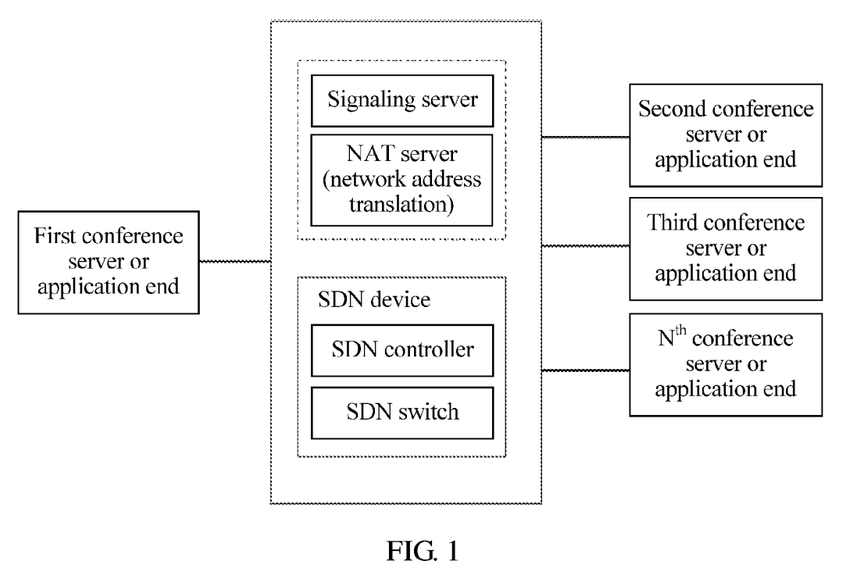
FIG. 1 is a schematic architectural diagram of a multicast system for an SDN network according to an embodiment of the present disclosure.

Referring to FIG. 1, a multicast system for a software-defined network in an embodiment of the present disclosure includes a first conference server or application end, an SDN device, a signaling server, a NAT server, a second conference server or application end, a third conference server or application end, and an $N^{th}$ conference server or application end. The first conference server or application end is a multicast sending device, the second conference server or application end, the third conference server or application end, and the $N^{th}$ conference server or application end are multicast receiving devices, and data sent by the multicast sending device is copied by the SDN device and then forwarded to several multicast receiving devices.

Figure 2:
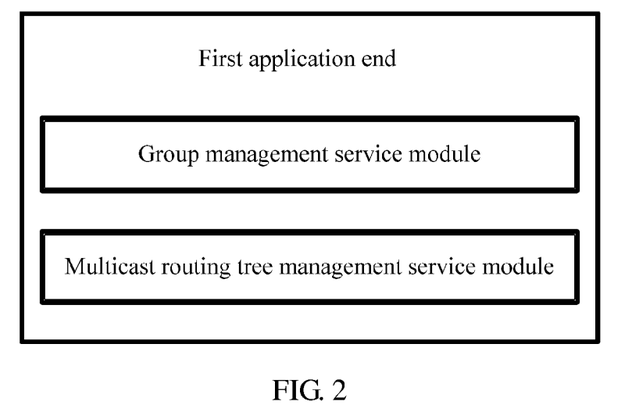
FIG. 2 is a schematic diagram of a composition of a first application end according to an embodiment of the present disclosure.

As shown in FIG. 2, the first application end further includes a group management service module and a multicast routing tree management service module. The group management service module is configured to create a multicast group according to an applied multicast IP address or a group ID defined by an SDN controller itself and manage a member of the multicast group, including joining and exiting of the member of the multicast group, maintenance of an online status of the member of the multicast group, and the like. Certainly, a function of the group management service module may also be completed by a dedicated server.

Figure 3:
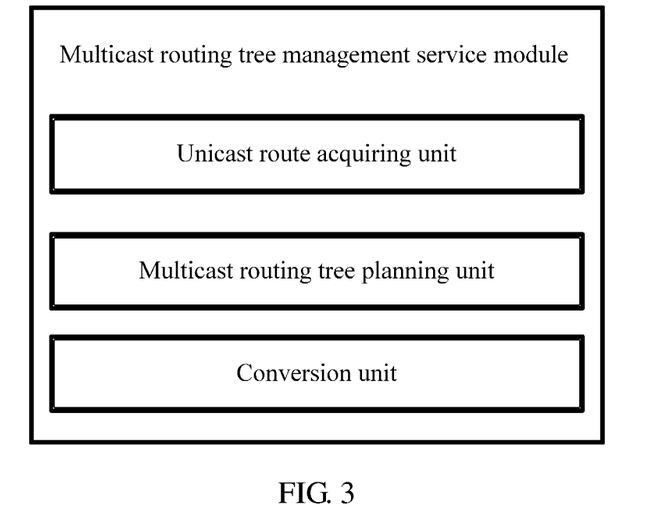
FIG. 3 is a schematic diagram of a composition of a multicast routing tree management service module according to an embodiment of the present disclosure.

As shown in FIG. 3, the multicast routing tree management service module further includes a unicast route acquiring unit, a multicast routing tree planning unit, and a conversion unit. The unicast route acquiring unit is configured to acquire existing unicast routing information in a network; the multicast routing tree planning unit is configured to complete planning of a multicast routing tree according to the unicast routing information; and the conversion unit is configured to convert the planning of the multicast routing tree into a flow entry modification instruction that can be executed by the SDN controller.

The multicast routing tree management service module sends the flow entry modification instruction to the SDN controller using a northbound API of the SDN controller. Certainly, the multicast routing tree management service module may be disposed on the SDN controller or another server.

Figure 4:
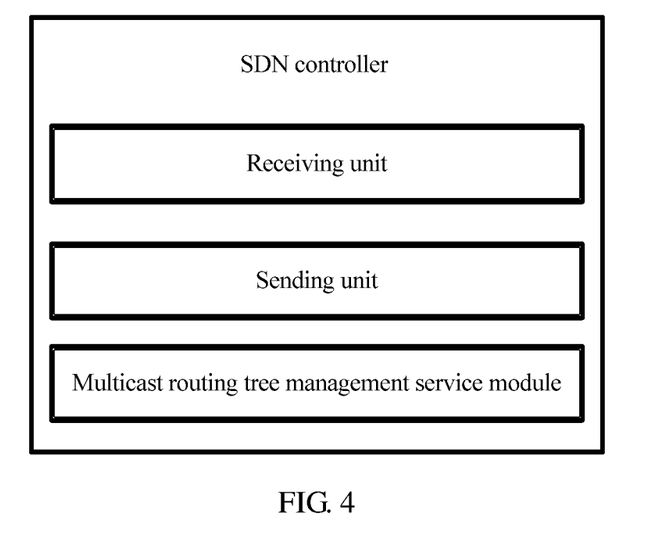
FIG. 4 is a schematic diagram of a composition of an SDN controller according to an embodiment of the present disclosure.

The SDN device includes the SDN controller and an SDN switch. As shown in FIG. 4, the SDN controller further includes a receiving unit configured to receive a request for applying for a multicast IP address or a group ID defined by the SDN controller itself, where the request is sent by the multicast sending device; and a sending unit configured to send the multicast IP address or the group ID defined by the SDN controller itself to the multicast sending device, and send a flow entry to the SDN switch. The SDN controller may execute a flow entry (where the "flow entry" and a "routing table entry" of an existing switch have a similar function) modification instruction, and send a flow entry using a southbound API to the SDN switch to instruct the SDN switch to execute, according to a modified flow entry, a data forwarding task. In addition, the SDN controller further opens up the northbound API to the first application end, so that the application end can invoke a service of the SDN controller using the northbound API. The SDN switch is a switch that forwards data according to the flow entry.

The signaling server is separately connected to the first conference server or application end (multicast sending device) and the $N^{th}$ conference server or application end (multicast receiving device) and is configured to transfer signaling between the multicast sending device and the multicast receiving device. The NAT server can translate an IP address of a local area network to a public IP address. The multicast receiving device may be in a public network or a local area network. When a multicast sending device in a local area network sends outgoing information using a proxy server, the proxy server maps a communications port number of a client of the multicast receiving device to a public IP address and a port number of the proxy server, and the NAT server can find out the mapped-to public IP address and port number. Then, the multicast sending device sends data to the public IP address and the port number to which the proxy server maps the multicast receiving device.

Figure 5:
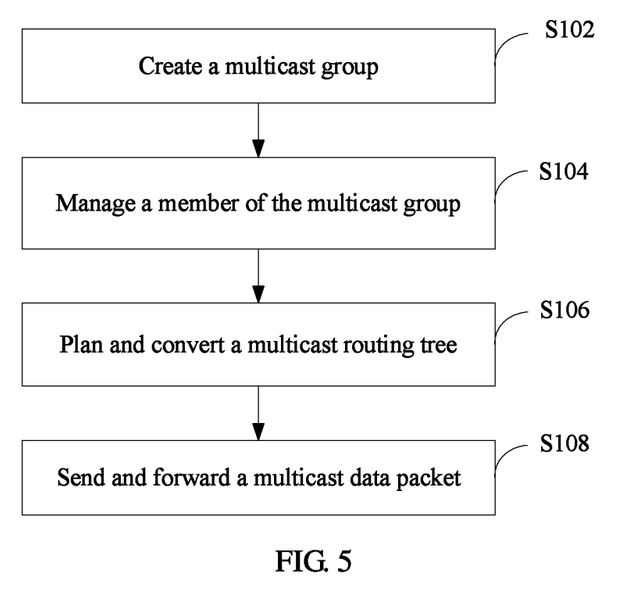
FIG. 5 is a flowchart according to an embodiment of the present disclosure.
Figure 6A:
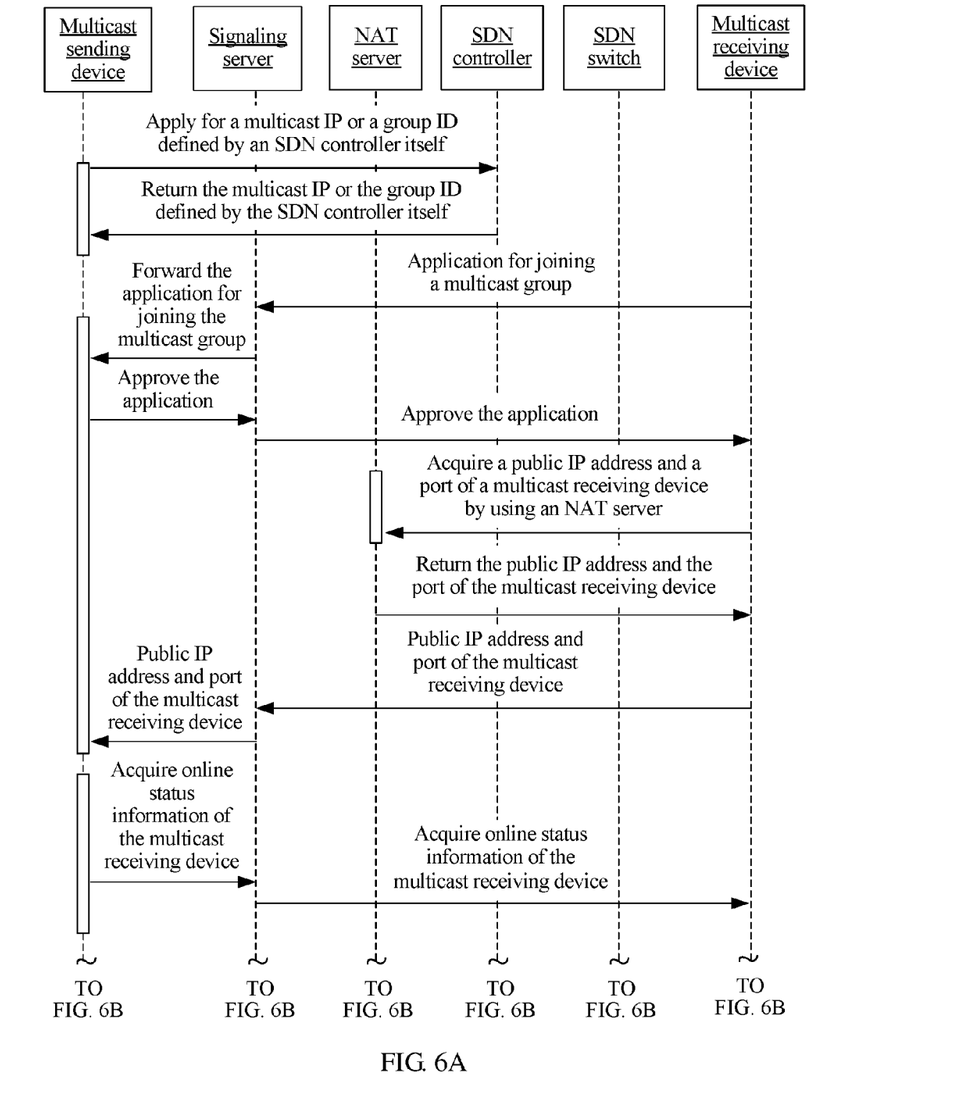
FIG. 6A and FIG. 6B are a schematic flowchart of network element interaction according to an embodiment of the present disclosure.
Figure 6B:
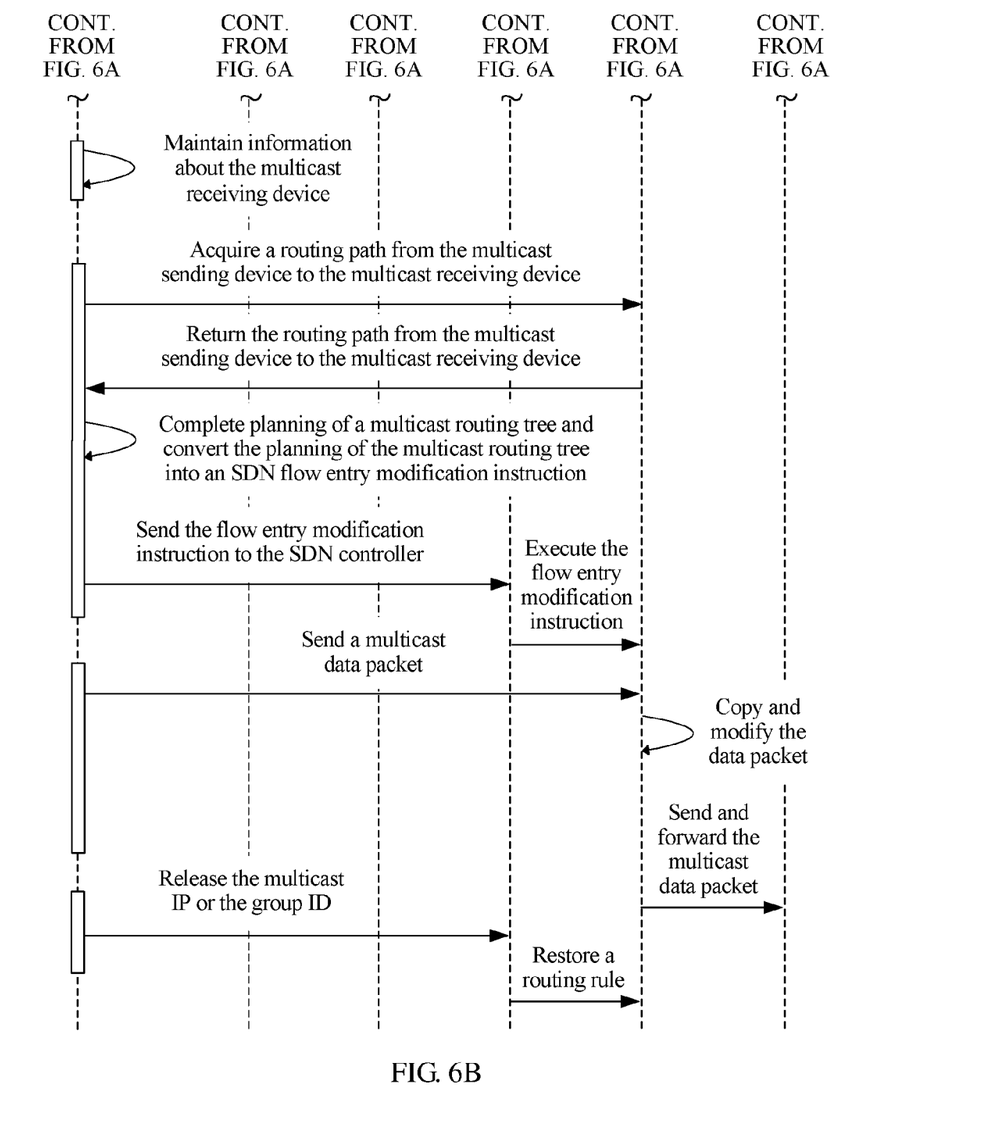

With reference to FIG. 5 and FIG. 6A and FIG. 6B, a multicast method for an SDN network in an embodiment of the present disclosure mainly includes the following steps.

S102. Create a multicast group, including a group management service module disposed on a multicast sending device (application end or conference server) applies, using a northbound API of an SDN controller, to the SDN controller for a multicast IP address or a group ID defined by the SDN controller itself; and the SDN controller returns, to the group management service module using the northbound API, the multicast IP address or the group ID defined by the SDN controller itself.

S104. Manage a member of the multicast group, including the following sub-steps.

(1). The group management service module of the multicast sending device indirectly receives, using a signaling server, or directly receives an application for joining the multicast group, where the application is sent by a multicast receiving device; and then approves or rejects the application.

For example, an Internet Protocol television (IPTV) is multicast communications from a server end to a client, and a server has a public IP address. The group management service module is disposed on the server end, and the client, as the multicast receiving device, directly transmits signaling using the Hypertext Transfer Protocol (HTTP) protocol with the group member management service module on the server end; therefore, no signaling server or NAT server is required.

(2). The group management service module acquires a public IP address of a multicast receiving device that joins the multicast group, when the multicast receiving device has a public IP address, the multicast receiving device directly sends the public IP address of the multicast receiving device to the group management service module; or when the multicast receiving device does not have a public IP address, for example, a multiparty conference based on Web Real-Time Communication (Web RTC) is client-to-client multicast communications and generally neither of two communication parties has a public IP address, the multicast receiving device needs to acquire a public IP address and a port number of the multicast receiving device using a NAT server, and sends the public IP address and the port number to the group management service module using a signaling server.

(3). The group management service module acquires online status information of the multicast receiving device that joins the multicast group, and maintains information about the multicast receiving device according to the online status information. The maintaining of the information about the multicast receiving device includes addition or modification of a member, going offline of an existing member, and deletion of a member that proactively exits, or the like.

S106. Plan and convert a multicast routing tree. The multicast routing tree is a "path tree" of a data packet that is transmitted from the multicast sending device to the multicast receiving device using a switch. A root node of the multicast routing tree is the multicast sending device, and multiple leaf nodes of the multicast routing tree are multicast receiving devices. The planning a multicast routing tree includes a multicast routing tree management service module disposed on the multicast sending device or on the SDN controller acquires a routing path from the multicast sending device to the multicast receiving devices to complete the planning of the multicast routing tree.

Then, the planning of the multicast routing tree is converted into a flow entry modification instruction that can be executed by the SDN controller.

When the multicast routing tree management service module is disposed on the multicast sending device, the multicast routing tree management service module sends the flow entry modification instruction to the SDN controller using the northbound API of the SDN controller.

Figure 7:
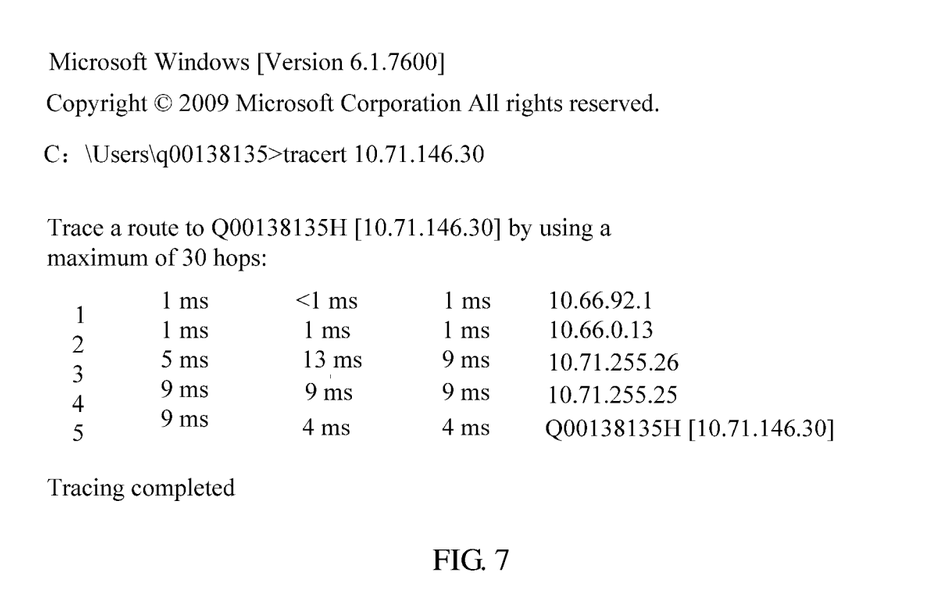
FIG. 7 is a schematic diagram according to a second embodiment of the present disclosure.

When the multicast routing tree management service module is disposed on the multicast sending device, the multicast routing tree management service module may acquire existing unicast routing information in an SDN network using the following two methods: (1) As shown in FIG. 7, a route tracing function is completed using an existing system interface, for example, using a tracert command, so as to acquire information about a rout from the multicast sending device to the multicast receiving device. As shown in FIG. 7, it is assumed that an address of the multicast receiving device is 10.71.146.30. When the multicast sending device executes a command of "tracert 10.71.146.30", a returned result of the command in FIG. 7 indicates that the multicast sending device sequentially passes through four hops of routes, including 10.66.92.1, 10.66.0.13, 10.71.255.26, and 10.71.255.25, and finally arrives at 10.71.146.30, the multicast receiving device. Therefore, complete information about a route from the multicast sending device to the multicast receiving device is obtained using the command. (2) The routing information is acquired from the SDN controller using the northbound API of the SDN controller. When the multicast routing tree management service module is disposed on the SDN controller, the SDN controller may directly acquire the existing unicast routing information.

In addition, to keep information about the multicast routing tree accurate, the multicast routing tree needs to be updated each time a member of the multicast group changes.

S108. Send and forward a multicast data packet, including the multicast sending device sends the data packet to the multicast IP address or the group ID (alternatively, adds the multicast IP address to the multicast data packet), where the multicast IP address or the group ID is applied in step S102. The SDN controller executes the flow entry modification instruction, and instructs an SDN switch using a southbound API to execute, according to a modified flow entry, a data forwarding task; and if necessary, may modify content of the data packet to change the multicast IP address of the data packet to an IP address of the multicast receiving device.

Figure 8:
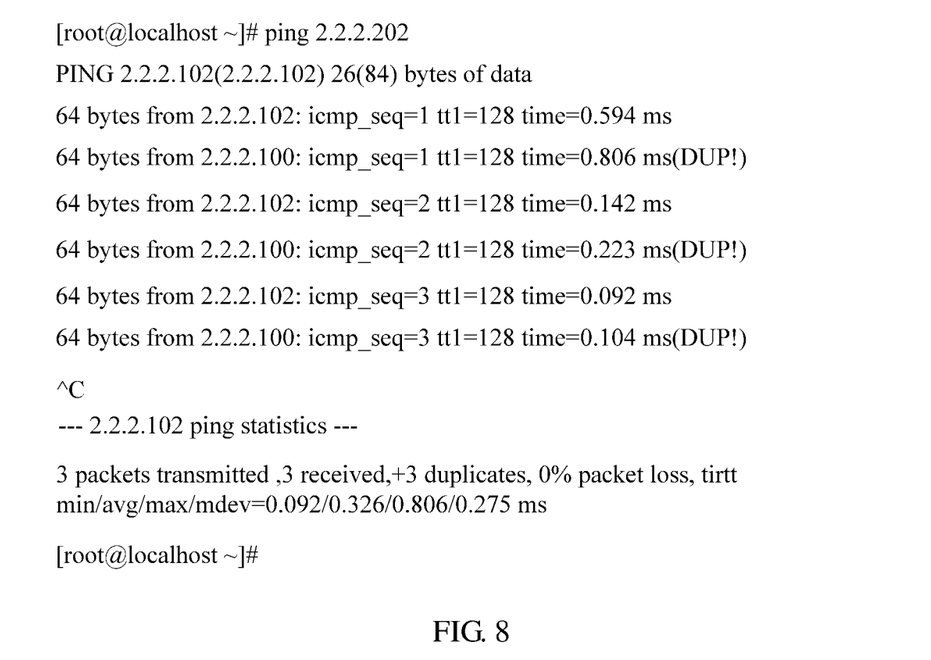
FIG. 8 is a schematic diagram according to a third embodiment of the present disclosure.

As shown in FIG. 8, the SDN switch copies and then sends the data packet sent to the multicast IP address 2.2.2.100, to two multicast receiving device clients, where IP addresses of the clients are 2.2.2.100 and 2.2.2.102. In this embodiment, a flow entry modification instruction that needs to be executed on an SDN controller that meets the OpenFlow 1.0 standard is as follows:

ovs-ofctl add-flow br0 idle_timeout=0,dl_type=0x0800, nw_dst=2.2.2.102,actions=mod_dl_dst:28:6e:d4:07:1a:dc, mod_nw_dst=2.2.2.102,output:4,mod_dl_dst:00:25:9e:cb: 70:0d,mod_nw_dst=2.2.2.100,output:2

Optionally, after the sending of the multicast data packet is complete, and the multicast group does not need to be kept anymore, the multicast sending device may instruct the SDN controller to release the multicast IP address or the group ID, and the SDN controller further instructs the SDN switch to restore a routing rule.

Figure 9:
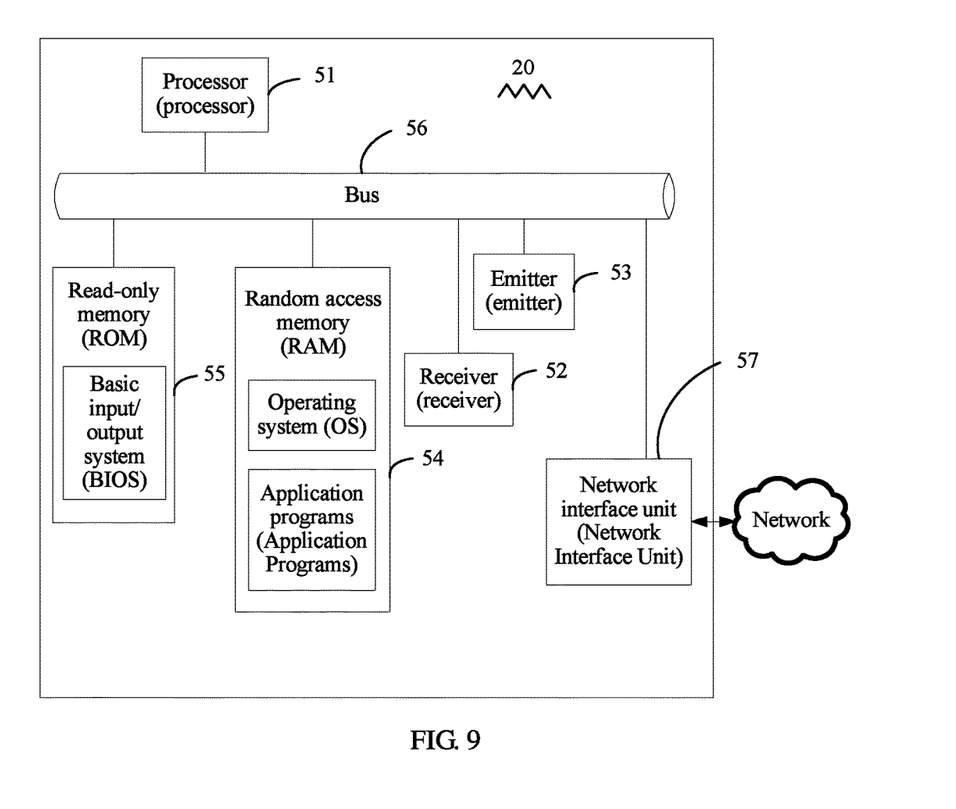
FIG. 9 is a schematic diagram according to a fourth embodiment of the present disclosure.

Referring to FIG. 9, FIG. 9 is a schematic structural diagram according to still another embodiment of the present disclosure. An SDN multicast system 20 includes a processor 51, a receiver 52, an emitter 53, a random access memory 54, a read-only memory 55, a bus 56, and a network interface unit 57. The processor 51 is separately coupled to the receiver 52, the emitter 53, the random access memory 54, the read-only memory 55, and the network interface unit 57 using the bus 56. When required to be run, the SDN multicast system is started up using a basic input/output system built in the read-only memory 55 or a bootloader guide system of an embedded system, to lead the SDN multicast system to enter a normal running state. After the SDN multicast system enters the normal running state, an application program and an operating system are run in the random access memory 54 to receive data from a network or send data to a network, so that the receiver 52 is configured to receive a multicast data packet; the processor 51 is configured to instruct an application end to create a multicast group and manage a member of the multicast group, and instruct the application end or an SDN controller to complete planning of a multicast routing tree according to the multicast group; and the emitter 53 is configured to forward the multicast data packet according to the planning of the multicast routing tree.

In this embodiment, the processor 51 may be a central processing unit (CPU), or an application specific integrated circuit (ASIC), or may be configured as one or more integrated circuits implementing this embodiment of this application.

In the foregoing technical solutions, multicast is completed by means of mutual cooperation between a multicast sending device and an SDN network, which greatly reduces complexity of multicast configuration. Not only multicast from a server to a client can be implemented, but also SDN multicast from a client to a client can be implemented. In addition, in the present disclosure, an audio and video conference can be implemented without a need to further deploy a dedicated MCU, and therefore, network costs can be significantly reduced.

In the several implementation manners provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or a part contributing to the prior art, or all or a part of the technical solutions may be implemented in a form of a software product. The software product is stored in a storage medium and includes several instructions for instructing a computer device (which may be a personal computer, a server, or a network device) or a processor to perform all or a part of the steps of the methods described in the implementation manners of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely implementation manners of this application, and are not intended to limit the scope of this application. An equivalent structural or equivalent process alternation made using the content of the specification and drawings of this application, or an application of the content of the specification and drawings directly or indirectly to another related technical field, shall fall within the protection scope of this application.

What is claimed is:

1. A multicast method for a software-defined network, comprising:
    creating, by a multicast sending device, a multicast group;
    managing, by the multicast sending device, a member of the multicast group;
    completing, by a multicast routing tree management service module disposed on the multicast sending device or on a software-defined network (SDN) controller, planning of a multicast routing tree; and
    converting the planning of the multicast routing tree into a flow entry modification instruction that can be executed by the SDN controller such that the SDN controller executes the flow entry modification instruction and instructs an SDN switch using a southbound application programming interface (API) to execute, according to a modified flow entry, a multicast task.

2. The multicast method of claim 1, wherein creating the multicast group comprises:
    applying, by a group management service module of the multicast sending device using a northbound API of the SDN controller, to the SDN controller for a multicast internet protocol (IP) address or a group identification (ID); and
    receiving the multicast IP address or the group ID defined by the SDN controller, the multicast IP address or the group ID being returned by the SDN controller using the northbound API.

3. The multicast method of claim 1, wherein managing the member of the multicast group comprises:
    receiving, by a group management service module of the multicast sending device, an application for joining the multicast group, the application being sent by a multicast receiving device;
    approving, by the group management service module, the application;
    acquiring, by the group management service module, a public internet protocol (IP) address of the multicast receiving device;
    acquiring, by the group management service module, online status information of the multicast receiving device; and
    maintaining, by the group management service module, information about the multicast receiving device according to the online status information.

4. The multicast method of claim 1, wherein after completing the planning of the multicast routing tree, the multicast method further comprises sending, by the multicast routing tree management service module, the flow entry modification instruction to the SDN controller using the northbound application programming interface (API) of the SDN controller when the multicast routing tree management service module is disposed on the multicast sending device.

5. The multicast method of claim 3, wherein receiving the application for joining the multicast group comprises receiving the application for joining the multicast group by the group management service module, the application being directly sent by the multicast receiving device or indirectly sent by the multicast receiving device using a signaling server, and acquiring the public IP address of the multicast receiving device comprises sending, by the multicast receiving device, the public IP address of the multicast receiving device directly to the group management service module when the multicast receiving device has a public IP address.

6. The multicast method of claim 3, wherein receiving the application for joining the multicast group comprises receiving the application for joining the multicast group by the group management service module, the application being directly sent by the multicast receiving device or indirectly sent by the multicast receiving device using a signaling server, acquiring the public IP address of the multicast receiving device comprising:
    acquiring, by the multicast receiving device, a public IP address and a port number of the multicast receiving device using a network address translation (NAT) server; and
    sending the public IP address and the port number to the group management service module using the signaling server when the multicast receiving device does not have a public IP address.

7. An apparatus implemented in a software-defined network (SDN), comprising:
    a memory configured to store a software program; and
    a processor coupled to the memory and being configured to:
        create a multicast group and manage a member of the multicast group;
        complete planning of a multicast routing tree according to the multicast group; and
        convert the planning of the multicast routing tree into a flow entry modification instruction for an SDN controller so as to permit the SDN controller to execute the flow entry modification instruction and instruct an SDN switch via a southbound application programming interface (API) to execute, according to a modified flow entry, a multicast task.

8. The apparatus of claim 7, wherein the processor is further configured to:
apply, using a northbound API of the SDN controller, to the SDN controller for a multicast internet protocol (IP) address or a group identification (ID); and
receive the multicast IP address or the group ID defined by the SDN controller, the multicast IP address or the group ID being returned by the SDN controller using the northbound API.

9. The apparatus of claim 7, wherein the processor is further configured to:
receive, an application for joining the multicast group, the application being sent by a multicast receiving device;
approve the application;
acquire a public internet protocol (IP) address of a multicast receiving device that joins the multicast group;
acquire online status information of the multicast receiving device that joins the multicast group; and
maintain information about the multicast receiving device according to the online status information.

10. A multicast method, comprising:
identifying, by a multicast sending device, a multicast group of a plurality of receiving devices to receive a data packet;
generating, by the multicast sending device, multicast routing information for the multicast group, the multicast routing information comprising information for routing the data packet from the multicast sending device to the plurality of receiving devices;
converting, by the multicast sending device, the multicast routing information into flow entry modification instructions for a software-defined network (SDN) device; and
sending, by the multicast sending device, the flow entry modification instructions to the SDN device to permit the SDN device to execute, according to the flow entry modification instructions, a multicast task to send the data packet to the plurality of receiving devices.

11. The method of claim 10, wherein identifying the multicast group comprises:
requesting, by the multicast sending device using a northbound application programming interface (API) of a SDN controller in the SDN device, the SDN controller for a multicast internet protocol (IP) address or a group identification (ID); and
receiving, by the multicast sending device from the SDN controller using the northbound API, the multicast IP address or the group ID defined by the SDN controller.

12. The method of claim 10, further comprising:
receiving, by the multicast sending device, a request to join the multicast group from a receiving device of the plurality of receiving devices;
acquiring, by the multicast sending device, a public IP address of the receiving device;
acquiring, by the multicast sending device, online status information of the receiving device; and
maintaining, by the multicast sending device, information about the receiving device according to the online status information.

13. The method of claim 10, wherein sending the flow entry modification instructions to the SDN device comprises sending, by the multicast sending device, the flow entry modification instructions to an SDN controller using a northbound application programming interface (API) of the SDN controller.

14. The method of claim 12, wherein receiving the request to join the multicast group comprises receiving, by the multicast sending device, the request to join the multicast group from the receiving device via a signaling server.

15. The method of claim 12, wherein acquiring the public internet protocol (IP) address of the receiving device comprises acquiring, by the multicast sending device, the public IP address and a port number of the receiving device obtained from a network address translation (NAT) server when the receiving device does not have a public IP address.

16. A multicast sending device, comprising:
a memory; and
a processor coupled to the memory and configured to:
identify a multicast group of a plurality of receiving devices to receive a data packet;
generate multicast routing information for the multicast group, the multicast routing information comprising information for routing the data packet from the multicast sending device to the plurality of receiving devices; and
convert the multicast routing information into flow entry modification instructions for a software-defined network (SDN) device of a SDN network; and
send the flow entry modification instructions to the SDN device to permit the SDN device to execute, according to the flow entry modification instructions, a multicast task to send the data packet to the plurality of receiving devices.

17. The multicast sending device of claim 16, wherein the processor is further configured to:
request, via a northbound application programming interface (API) of an SDN controller of the SDN device, the SDN controller for a multicast internet protocol (IP) address or a group identification (ID); and
receive, from the SDN controller via the northbound API, the multicast IP address or the group ID defined by the SDN controller.

18. The multicast sending device of claim 16, wherein the processor is further configured to:
receive a request to join the multicast group from a receiving device of the plurality of receiving devices;
acquire a public internet protocol (IP) address of the requesting receiving device;
acquire online status information of the receiving device; and
maintain information about the receiving device according to the online status information.

19. The multicast sending device of claim 16, wherein the processor is configured to send the flow entry modification instructions to an SDN controller using a northbound application programming interface (API) of the SDN controller.

20. The multicast sending device of claim 18, wherein the processor is configured to receive the request to join the multicast group from the receiving device via a signaling server.

* * * * *